United States Patent
Kuwazuru et al.

(10) Patent No.: US 12,546,537 B2
(45) Date of Patent: Feb. 10, 2026

(54) COLLECTING APPARATUS, CONDENSATION EQUIPMENT, AND COLLECTING METHOD

(71) Applicant: MITSUBISHI HEAVY INDUSTRIES, LTD., Tokyo (JP)

(72) Inventors: Kazushige Kuwazuru, Tokyo (JP); Tatsuki Ueda, Tokyo (JP); Daiki Fujimura, Tokyo (JP); Motohiro Goshima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 282 days.

(21) Appl. No.: 18/279,508

(22) PCT Filed: Feb. 10, 2022

(86) PCT No.: PCT/JP2022/005429
§ 371 (c)(1),
(2) Date: Aug. 30, 2023

(87) PCT Pub. No.: WO2022/190764
PCT Pub. Date: Sep. 15, 2022

(65) Prior Publication Data
US 2024/0151471 A1     May 9, 2024

(30) Foreign Application Priority Data
Mar. 10, 2021 (JP) .................................. 2021-038720

(51) Int. Cl.
*F28B 9/08* (2006.01)
*F01D 25/32* (2006.01)

(52) U.S. Cl.
CPC ............... *F28B 9/08* (2013.01); *F01D 25/32* (2013.01)

(58) Field of Classification Search
CPC .. F01K 9/02; F22B 37/18; F22B 37/48; F28B 9/08; B01D 35/28; B01D 2201/24;
(Continued)

(56) References Cited

U.S. PATENT DOCUMENTS

2019/0032973 A1    1/2019   Tanaka et al.
2019/0390910 A1*  12/2019   Dokic ..................... F01K 11/02

FOREIGN PATENT DOCUMENTS

DE      24 22 187         11/1975
EP       2829692 A1  *   1/2015   ............... F28B 9/08
(Continued)

OTHER PUBLICATIONS

Pdf is translation of foreign reference EP-2829692-A1 (Year: 2015).*
(Continued)

*Primary Examiner* — Len Tran
*Assistant Examiner* — Kamran Tavakoldavani
(74) *Attorney, Agent, or Firm* — Wenderoth, Lind & Ponack, L.L.P.

(57) ABSTRACT

This collecting apparatus collects foreign matter mixed in condensate in/from a condenser of a steam turbine plant, and comprises a first foreign matter collector and an in-condenser collector. The first foreign matter collector is provided on an upstream side of a condensate pump in a pipe connecting a drain outlet provided to the bottom portion of the condenser and the condensate pump to each other, has an opening having a first dimension, and collects foreign matter while passing the condensate therethrough. The in-condenser collector is provided inside the condenser, has an opening having a second dimension larger than the first dimension, and collects foreign matter while passing the condensate in the condenser therethrough toward the drain outlet.

9 Claims, 9 Drawing Sheets

(58) Field of Classification Search
CPC ......... B01D 29/03; B01D 35/02; F01D 25/32; F01D 25/00
See application file for complete search history.

(56) References Cited

FOREIGN PATENT DOCUMENTS

| | | |
|---|---|---|
| GB | 1 505 586 | 3/1978 |
| JP | 2-218803 | 8/1990 |
| JP | 9-314058 | 12/1997 |
| JP | 2002-004810 | 1/2002 |
| JP | 2004-324821 | 11/2004 |
| JP | 2007-033352 | 2/2007 |
| JP | 2010-180837 | 8/2010 |
| JP | 2012-57520 | 3/2012 |
| JP | 2017-133813 | 8/2017 |
| JP | 2018-058019 | 4/2018 |
| JP | 2020024066 A * | 2/2020 |

OTHER PUBLICATIONS

Pdf is translation of foreign reference JP-2020024066-A (Year: 2020).*
International Search Report issued Mar. 22, 2022 in International (PCT) Application No. PCT/JP2022/005429.
Written Opinion of the International Searching Authority issued Mar. 22, 2022 in International (PCT) Application No. PCT/JP2022/005429.

* cited by examiner

COLLECTING APPARATUS, CONDENSATION EQUIPMENT, AND COLLECTING METHOD

TECHNICAL FIELD

The present disclosure relates to a collecting apparatus, condensation equipment, and a collecting method.

Priority is claimed on Japanese Patent Application No. 2021-038720 filed on Mar. 10, 2021, the content of which is incorporated herein by reference.

BACKGROUND ART

Generally, a steam turbine plant includes a boiler, a steam turbine driven by steam from the boiler, a condenser that converts steam discharged from the steam turbine back into water, a condensate pump, and a pipe that guides water in the condenser to the condensate pump. The pipe that connects the condenser and the condensate pump may be provided with a foreign matter collector that collects foreign matter contained in condensed water. For example, disclosed in Japanese Unexamined Patent Application Publication No. 2018-58019 (hereinafter, JP '019) is a thermal power generation plant in which a strainer is provided between a condenser and a condensate pump.

However, in a case where the foreign matter collector as described in JP '019 is simply provided, there is a problem that the foreign matter collector is likely to be clogged in a case where there is a large amount of foreign matter and the burden of cleaning of the foreign matter collector is increased.

The present disclosure is made to solve the above-described problem, and an object of the present invention is to provide a collecting apparatus, condensation equipment, and a collecting method with which it is possible to reduce the burden of cleaning.

SUMMARY OF THE INVENTION

In order to solve the above-mentioned problems, the present disclosure provides a collecting apparatus which collects foreign matter mixed into condensate of a condenser of a steam turbine plant, the apparatus including a first foreign matter collector and an in-condenser collector. The first foreign matter collector is provided upstream of a condensate pump in a pipe connecting a drain port provided at a bottom portion of the condenser and the condensate pump to each other, includes an opening having a first dimension, and collects the foreign matter while allowing the condensate to pass therethrough. The in-condenser collector is provided in the condenser, includes an opening having a second dimension larger than the first dimension, and collects the foreign matter while allowing the condensate in the condenser to pass therethrough and flow toward the drain port.

In order to solve the above-mentioned problems, the present disclosure provides condensation equipment including a condenser and a collecting apparatus. The collecting apparatus is an apparatus which collects foreign matter mixed into condensate of the condenser and includes a first foreign matter collector and an in-condenser collector. The first foreign matter collector is provided upstream of a condensate pump in a pipe connecting a drain port provided at a bottom portion of the condenser and the condensate pump to each other, includes a first opening having a first dimension, and collects the foreign matter while allowing the condensate to pass therethrough. The in-condenser collector is provided in the condenser, includes a second opening having a second dimension larger than the first dimension, and collects the foreign matter while allowing the condensate in the condenser to pass therethrough and flow toward the drain port.

In order to solve the above-mentioned problems, the present disclosure provides a collecting method of collecting foreign matter mixed into condensate of a condenser of a steam turbine plant, the method including installing a first foreign matter collector, installing an in-condenser collector, and performing a blowing-out operation in a state where the first foreign matter collector and the in-condenser collector are installed. The first foreign matter collector is provided upstream of a condensate pump in a pipe connecting a drain port provided at a bottom portion of the condenser and the condensate pump to each other, includes a first opening having a first dimension, and collects the foreign matter while allowing the condensate to pass therethrough. The in-condenser collector is provided in the condenser, includes a second opening having a second dimension larger than the first dimension, and collects the foreign matter while allowing the condensate in the condenser to pass therethrough and flow toward the drain port.

Advantageous Effects of Invention

According to the collecting apparatus, the condensation equipment, and the collecting method of the present disclosure, it is possible to reduce the burden of cleaning.

DESCRIPTION OF EMBODIMENTS

Figure 1:
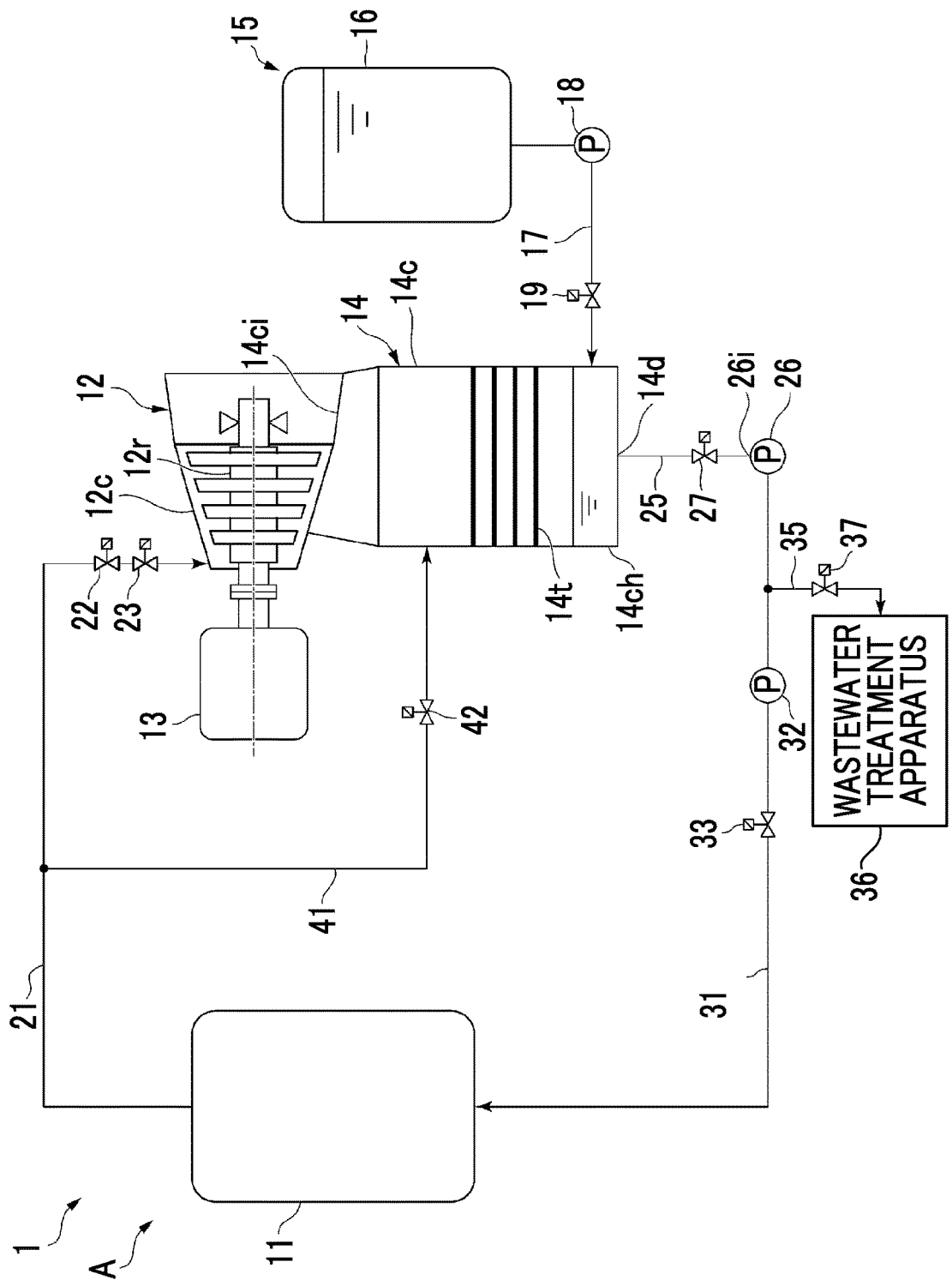
FIG. 1 is a diagram showing a configuration of the steam turbine plant in a permanent installation state according to a first embodiment of the present disclosure.

Hereinafter, a collecting apparatus, condensation equipment, and a collecting method according to an embodiment of the present disclosure will be described with reference to the drawings. In the following description, configurations having the same or similar functions are given the same reference numerals. In addition, repetitive description of such configurations may be omitted.

First Embodiment

Hereinafter, a first embodiment of the present disclosure will be described with reference to FIGS. 1 to 4.
(Configuration of Steam Turbine Plant)
First, a steam turbine plant 1 of the first embodiment will be described.

FIG. 1 is a diagram showing a configuration of the steam turbine plant 1 in a permanent installation state (a commercial operation state) according to the first embodiment. A permanent installation section A of the steam turbine plant 1 includes a boiler 11, a steam turbine 12, a generator 13, a condenser 14, a pure water supply apparatus 15, a main steam line 21, a steam stop valve 22, a steam control valve 23, a condensate line 25, a condensate pump 26, a condensate outlet valve 27, a water supply line 31, a water supply pump 32, a water supply control valve 33, a water supply blow line 35, a wastewater treatment apparatus 36, a water supply blow valve 37, a steam bypass line 41, and a bypass steam blow valve 42.

The boiler 11 heats water to generate steam. The steam turbine 12 includes a turbine rotor 12r and a turbine casing 12c that covers the turbine rotor 12r. The steam from the boiler 11 flows into the turbine casing 12c. The turbine rotor 12r is rotated by the steam flowing into the turbine casing 12c. A rotor of the generator 13 is connected to the turbine rotor 12r.

The condenser 14 is a device that cools and condenses steam after extraction of work at the steam turbine 12 to convert the steam into water. The condenser 14 includes, for example, a condenser casing 14c and a heat transfer pipe group 14t that is disposed inside the condenser casing 14c and is composed of a plurality of heat transfer pipes. The condenser casing 14c includes a steam inlet opening 14ci that guides steam discharged from the steam turbine 12 to the inside of the condenser casing 14c itself. A cooling medium for cooling the steam discharged from the steam turbine 12 flows through the plurality of heat transfer pipes. For example, the cooling medium is seawater or river water. The steam discharged from the steam turbine 12 is converted into water by being cooled by the cooling medium flowing inside the heat transfer pipes. Hereinafter, the water may be referred to as condensate in some cases. A portion of the condenser casing 14c that is below the heat transfer pipe group 14t forms a hot well 14ch. The condensate is accumulated in the hot well 14ch.

The pure water supply apparatus 15 includes a pure water tank 16 storing pure water, a pure water line 17 guiding the pure water stored in the pure water tank 16 into the condenser casing 14c, a pure water pump 18 provided in the pure water line 17, and a pure water control valve 19 disposed closer to the condenser 14 than the pure water pump 18 in the pure water line 17. When the amount of condensate inside the condenser casing 14c becomes small, the pure water control valve 19 is opened so that the condenser casing 14c is replenished with the pure water inside the pure water tank 16 that serves as condensate.

The main steam line 21 connects a steam outlet of the boiler 11 and a steam inlet of the turbine casing 12c. The main steam line 21 is provided with the steam stop valve 22 for stopping an inflow of the steam into the steam turbine 12, and the steam control valve 23 for adjusting the flow rate of the steam flowing into the steam turbine 12.

The condensate line 25 connects a drain port 14d of the hot well 14ch of the condenser casing 14c and a suction port 26i of the condensate pump 26. The condensate outlet valve 27 is provided in the condensate line 25. The condensate pump 26 sucks in condensate flowing through the condensate line 25 and sends the sucked-in condensate to the water supply line 31. In this manner, the condensate pump 26 extracts condensate from the hot well 14ch of the condenser 14 and supplies the extracted condensate to the water supply pump 32.

The water supply line 31 connects a discharge port of the condensate pump 26 and a water inlet of the boiler 11. The water supply line 31 is provided with the water supply pump 32 that sends water to the boiler 11 by raising the pressure of the water from the condensate pump 26. The water supply control valve 33 that adjusts the flow rate of water sent to the boiler 11 is provided at a position closer to the boiler 11 than the water supply pump 32 in the water supply line 31.

The water supply blow line 35 is connected to the water supply line 31 at a position closer to the condensate pump 26 than the water supply pump 32. The wastewater treatment apparatus 36 is connected to a tip of the water supply blow line 35. The wastewater treatment apparatus 36 performs purification treatment on water flowing through the water supply line 31. The water supply blow line 35 is connected to the wastewater treatment apparatus 36 to communicate with a treatment water receiving space that receives purification treatment target water in the wastewater treatment apparatus 36. The water supply blow valve 37 is provided in the water supply blow line 35.

The steam bypass line 41 branches off from the main steam line 21 at a position between the boiler 11 and the steam stop valve 22. The steam bypass line 41 is connected to the condenser 14. The bypass steam blow valve 42 is provided in the steam bypass line 41.
(Collecting Apparatus)

Next, a collecting apparatus 50 provided in the steam turbine plant 1 will be described. In the following description, "the inside of the condenser 14" means the inside of the condenser casing 14c, and "a bottom portion 14b of the condenser 14" means a bottom portion of the condenser casing 14c. In the present embodiment, "condensation equipment CE" is composed of the condenser 14, the collecting apparatus 50, and a condensate pipe 60 which will be described later.

Figure 2:
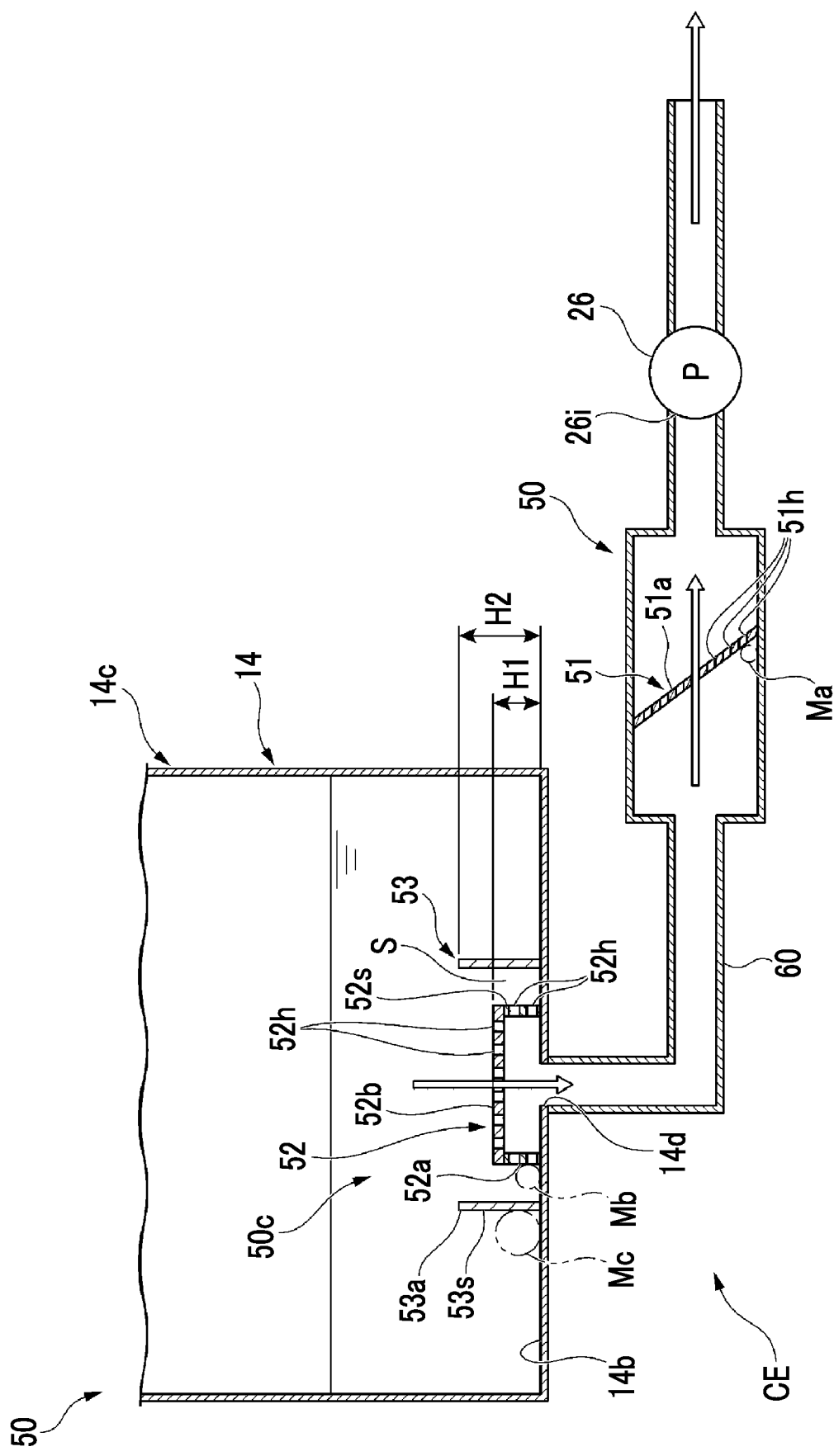
FIG. 2 is a view showing a collecting apparatus according to the first embodiment of the present disclosure.

FIG. 2 is a view showing the collecting apparatus 50 according to the first embodiment. The collecting apparatus 50 is an apparatus that collects foreign matter M mixed into the condensate of the condenser 14 of the steam turbine plant 1. The collecting apparatus 50 includes, for example, a condensate pump suction strainer 51 and an in-condenser collector 50c.

The condensate pump suction strainer 51 is provided in an intermediate portion of the condensate pipe 60 that connects the drain port 14d provided at the bottom portion 14b of the condenser 14 and the suction port 26i of the condensate pump 26. The condensate pipe 60 is a pipe that forms the condensate line 25. The condensate pump suction strainer 51 is provided upstream of the condensate pump 26 in the condensate pipe 60.

The condensate pump suction strainer ("first foreign matter collector") 51 is, for example, a collector that includes a plate member 51a and a plurality of first openings 51h provided in the plate member 51a and that collects foreign matter while allowing condensate to pass therethrough. Each of the first openings 51h has an opening width of a first dimension. The "opening width" means, for example, a diameter in a case where the opening is circular and means the maximum width in the opening in a case where the opening is polygonal. In other words, the "opening width" means the size of the largest foreign matter that can pass through the opening. The first dimension is, for example, smaller than 5 mm, and is smaller than 1 mm in one example.

Since such a condensate pump suction strainer 51 is provided, foreign matter Ma that is contained in condensate flowing through the condensate pipe 60 and of which the size is larger than the first dimension is collected by the condensate pump suction strainer 51. That is, the foreign matter Ma is accumulated upstream of the condensate pump suction strainer 51. The foreign matter Ma collected by the condensate pump suction strainer 51 is removed when the condensate pump suction strainer 51 is backwashed by a backwashing mechanism (not shown). The condensate pump suction strainer 51 is, for example, a foreign matter collector permanently installed in the steam turbine plant 1. The condensate pump suction strainer 51 is an example of a "first foreign matter collector". The condensate pump suction strainer 51 may be referred to as an "out-of-condenser foreign matter collector".

The in-condenser collector 50c is a collector that is provided in the condenser 14 and that collects foreign matter while allowing the condensate in the condenser 14 to pass therethrough and flow toward the drain port 14d. The in-condenser collector 50c includes, for example, an in-condenser strainer 52 and a guard pipe 53.

The in-condenser strainer 52 is provided inside the condenser 14 and covers the drain port 14d of the condenser 14 from above. The in-condenser strainer 52 is a collector that includes a plurality of openings 52h and that collects foreign matter while allowing condensate to pass therethrough. Each of the second openings 52h has an opening width of a second dimension. The second dimension is larger than the above-described first dimension (the dimension of the openings 51h of the condensate pump suction strainer 51). The second dimension is, for example, equal to or larger than 1 mm, and is equal to or larger than 5 mm in one example. From another viewpoint, the second dimension is, for example, smaller than 10 mm.

In the present embodiment, the in-condenser strainer 52 includes a tubular portion 52a formed by a side wall 52s having a tubular shape and a ceiling portion 52b that covers an upper portion of the tubular portion 52a. The "tubular shape" is not limited to a cylindrical shape, and may be a rectangular cylindrical shape. Such a definition also applies to the guard pipe 53 or an inertial collector 72 which will be described later. The diameter of the tubular portion 52a is larger than the diameter of the drain port 14d of the condenser 14. The tubular portion 52a is fixed to, for example, the bottom portion 14b of the condenser 14 by means of welding or the like. The plurality of openings 52h are provided in each of the tubular portion 52a and the ceiling portion 52b. That is, the condensate in the condenser 14 passes through the plurality of openings 52h provided in the tubular portion 52a and the plurality of openings 52h provided in the ceiling portion 52b to flow into the drain port 14d. In the present embodiment, the tubular portion 52a and the ceiling portion 52b are formed of perforated metal.

The in-condenser strainer 52 has a first height H1 as a height from the bottom portion 14b of the condenser 14. In the present embodiment, the first height H1 is a height from the bottom portion 14b of the condenser 14 to an upper surface of the ceiling portion 52b.

Since such an in-condenser strainer 52 is provided, foreign matter Mb that is contained in the condensate in the condenser 14 and of which the size is larger than the second dimension is collected by the in-condenser strainer 52. That is, the foreign matter Mb is accumulated upstream of the in-condenser strainer 52. The in-condenser strainer 52 is, for example, a foreign matter collector permanently installed in the steam turbine plant 1. The in-condenser strainer 52 is an example of a "second foreign matter collector". The in-condenser strainer 52 may also be referred to as a "first in-condenser foreign matter collector".

The guard pipe 53 is provided at the bottom portion 14b of the condenser 14, and surrounds the in-condenser strainer (second foreign matter collector) 52. The guard pipe 53 is a third foreign matter collector that includes one or more third openings 53h (refer to FIG. 3) and that collects foreign matter while allowing condensate to pass therethrough. In the present embodiment, the guard pipe 53 includes a tubular portion 53a formed by a side wall 53s having a tubular shape. The tubular portion 53a surrounds the tubular portion 52a of the in-condenser strainer 52. The tubular portion 53a is fixed to, for example, the bottom portion 14b of the condenser 14 by welding or the like. A gap S in which condensate can flow is provided between an inner peripheral surface of the tubular portion 53a and an outer peripheral surface of the tubular portion 52a of the in-condenser strainer 52. An upper portion of the tubular portion 53a is open.

Figure 3:
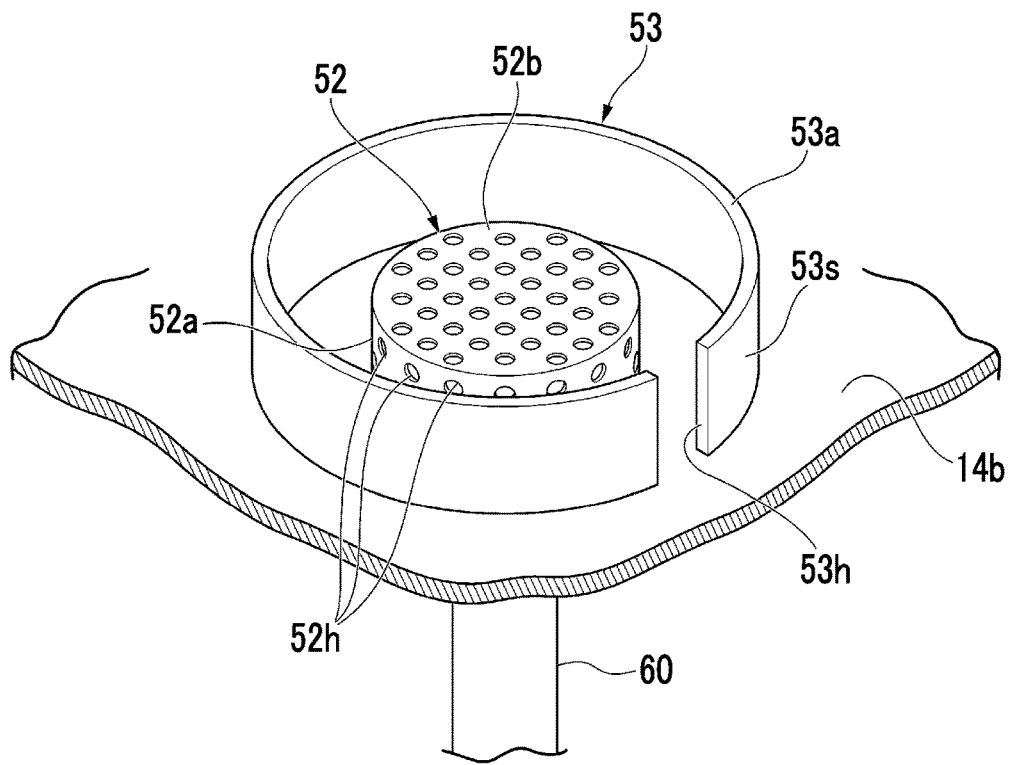
FIG. 3 is a perspective view showing a guard pipe according to the first embodiment of the present disclosure.

FIG. 3 is a perspective view showing the guard pipe 53. The opening 53h is provided in a portion of the tubular portion 53a in a circumferential direction and extends along an axial direction (a vertical direction) of the tubular portion 53a. The opening 53h reaches, for example, the bottom portion 14b of the condenser 14. In the present embodiment, the opening 53h is a cut (slot) extending from the upper end to the lower end of the tubular portion 53a. In other words, the guard pipe 53 of the present embodiment is formed by removing (for example, cutting) a portion of a short pipe in the circumferential direction. The opening 53h functions as a water passage gap that guides condensate on an outer peripheral side of the guard pipe 53 to an inner peripheral side of the guard pipe 53.

Figure 4:
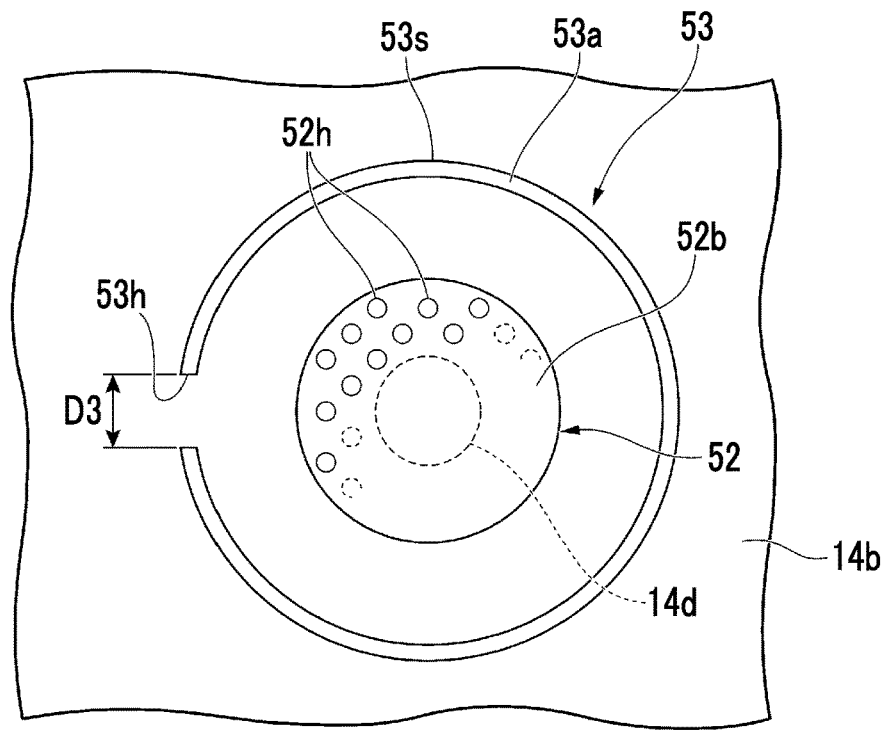
FIG. 4 is a plan view showing an in-condenser strainer and the guard pipe according to the first embodiment of the present disclosure.

FIG. 4 is a plan view showing the in-condenser strainer 52 and the guard pipe 53. The opening 53h has an opening width of a third dimension D3 in the circumferential direction of the tubular portion 53a. The "opening width" means a dimension in a direction orthogonal to a direction in which an opening extends in a case where the opening extends linearly. The third dimension D3 is larger than the above-described second dimension (the dimension of the openings 52h of the in-condenser strainer 52). The third dimension D3 is, for example, equal to or larger than 10 mm.

Referring again to FIG. 2, the description of the guard pipe 53 will be continued. The guard pipe 53 a second height H2 as a height from the bottom portion 14b of the condenser 14. In the present embodiment, the second height H2 is a height from the bottom portion 14b of the condenser 14 to an upper end of the tubular portion 53a. The second height H2 is larger than the first height H1 (the height of the in-condenser strainer 52).

Since such a guard pipe 53 is provided, foreign matter Mc (for example, the foreign matter Mc accumulated in the bottom portion 14b of the condenser 14) that is contained in condensate on the outer peripheral side of the guard pipe 53 and of which the size is larger than the third dimension D3 is collected by the guard pipe 53. That is, the foreign matter Mc is accumulated on the outer peripheral side of the guard pipe 53. The guard pipe 53 is, for example, a temporarily installed foreign matter collector. The guard pipe 53 is provided in the steam turbine plant 1 in a case where the condensate in the condenser 14 may contain a large amount of foreign matter (in a case where a blowing-out operation is performed or the like). However, the guard pipe 53 may be a foreign matter collector permanently installed in the steam turbine plant 1. The guard pipe 53 is an example of a "third foreign matter collector". The guard pipe 53 may be referred to as a "second in-condenser foreign matter collector".

(Procedure for Collecting Method)

Next, the procedure for a foreign matter collecting method according to the first embodiment will be described.

Figure 5:
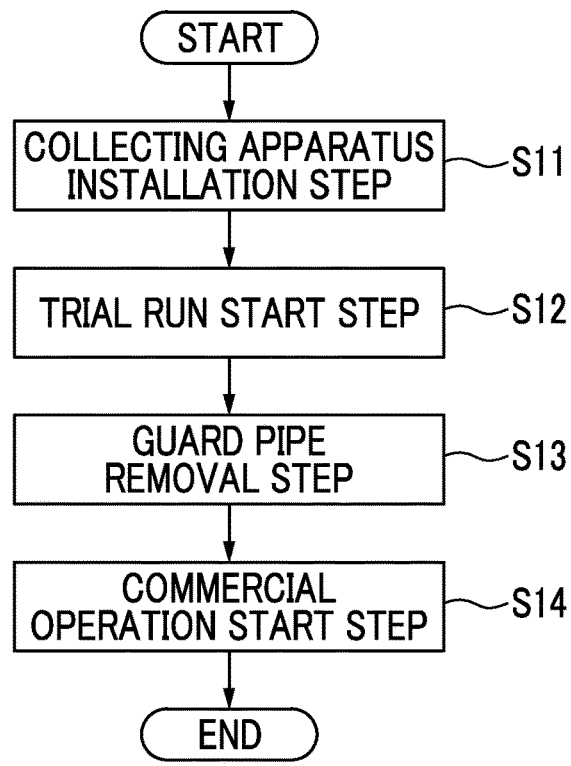
FIG. 5 is a flowchart showing the procedure for a collecting method according to the first embodiment of the present disclosure.

FIG. 5 is a flowchart showing the procedure for a collecting method according to the first embodiment of the present disclosure. The collecting method in the present embodiment is performed in a case where there is a probability that a large amount of foreign matter such as welding slag or grinding chips remains in a pipe or various equipment like after the steam turbine plant 1 is constructed or repaired, for example. The collecting method of the present embodiment includes, for example, a collecting apparatus installation step (S11), a trial run start step (S12) including a blowing-out operation, a guard pipe removal step (S13), and a commercial operation start step (S14).

In the collecting apparatus installation step (S11), the condensate pump suction strainer 51 is installed in the condensate pipe 60 and the in-condenser strainer 52 and the guard pipe 53 are installed inside the condenser 14. Such a collecting apparatus installation step (S11) is performed, for example, as a portion of an operation of constructing the steam turbine plant 1.

The trial run start step (S12) is performed after the collecting apparatus installation step (S11). In the trial run start step (S12), a trial run of the steam turbine plant 1 is started. A blowing-out operation with respect to the steam turbine plant 1 is performed as a portion of the trial run start step (S12). The blowing-out operation is an operation of supplying a high-pressure gas (steam or air) to a pipe or the like of a steam turbine plant 1 in order to remove foreign matter such as welding slag and grinding chips remaining in the pipe or various equipment. In the blowing-out operation of the present embodiment, for example, the high-pressure gas is supplied to the main steam line 21 and the steam turbine 12 so that foreign matter in the main steam line 21 and the steam turbine 12 is guided to the condenser 14. Additionally, in the blowing-out of the present embodiment, the high-pressure gas is supplied to the steam bypass line 41 so that foreign matter in the steam bypass line 41 is guided to the condenser 14. Accordingly, the foreign matter remaining in the main steam line 21, the steam turbine 12, the steam bypass line 41, and the like is guided to the condenser 14. The blowing-out operation described above is repeated a plurality of times as necessary.

The foreign matter guided to the condenser 14 tends to flow toward the condensate pump 26 together with the condensate in the condenser 14. While moving toward the condensate pump 26, pieces of the foreign matter guided to the condenser 14 are collected by the guard pipe 53, the in-condenser strainer 52, and the condensate pump suction strainer 51 in order of size. Thereafter, the guard pipe 53, the in-condenser strainer 52, and the condensate pump suction strainer 51 are cleaned. Accordingly, foreign matter generated during construction, repair, or the like of the steam turbine plant 1 is removed.

The guard pipe removal step (S13) is performed after the trial run start step (S12). In the guard pipe removal step (S13), the guard pipe 53 is removed from the bottom portion 14b of the condenser 14. However, the guard pipe 53 may be used as a permanently installed foreign matter collector without being removed from the condenser 14. In this case, the guard pipe removal step (S13) is omitted.

The commercial operation start step (S14) is performed after the guard pipe removal step (S13). In the commercial operation start step (S14), the commercial operation of the steam turbine plant 1 accompanied by power generation of the generator 13 is started. The foreign matter generated after the start of the commercial operation is collected by the in-condenser strainer 52 and the condensate pump suction strainer 51.

(Operation and Effect)

In the case of the collecting apparatus 50 configured as described above and the collecting method, foreign matter is collected by not only the condensate pump suction strainer 51 but also the in-condenser collector 50c provided in the condenser 14. For example, since the openings 51h of the condensate pump suction strainer 51 have the first dimension and the openings of the in-condenser collector 50c have the second dimension larger than the first dimension, the condensate in the condenser 14 is smoothly guided to the drain port 14d, at least a portion of the foreign matter causing the condensate pump suction strainer 51 to be clogged is collected in the condenser 14, and the foreign matter can be restrained from reaching the condensate pump suction strainer 51. Accordingly, it is possible to restrain the condensate pump suction strainer 51 from being clogged. As a result, it is possible to reduce the burden of cleaning of the condensate pump suction strainer 51.

As seen from another viewpoint, by using the collecting apparatus 50 and the collecting method of the present embodiment, it is possible to collect foreign matter contained in the condensate in the condenser 14 while preventing the condensate pump suction strainer 51 from being clogged. Therefore, as a method of performing the blowing-out operation, for example, a method of blowing out a gas into the condenser 14 at an initial stage of the blowing-out operation can be adopted. According to such a method of performing the blowing-out operation, for example, the number of steps necessary for the blowing-out operation can be made small in comparison with a case where the blowing-out operation is performed after a temporary pipe including an inertial collector is installed at the main steam line 21, the steam bypass line 41, or the like. Accordingly, a work period for construction or repair of the steam turbine plant 1 can be shortened.

In the present embodiment, the in-condenser collector 50c includes the in-condenser strainer 52 that includes the openings 52h having the second dimension and the guard pipe 53 that includes the opening 53h having the third dimension larger than the second dimension. According to such a configuration, pieces of foreign matter having different sizes are collected by the guard pipe 53, the in-condenser strainer 52, and the condensate pump suction strainer 51 in order of size. Therefore, the in-condenser strainer 52 and the condensate pump suction strainer 51 are less likely to be clogged. Accordingly, it is possible to further reduce the burden of cleaning.

In the present embodiment, the height H2 of the guard pipe 53 with respect to the bottom portion 14*b* of the condenser 14 is larger than the height H1 of the in-condenser strainer 52 with respect to the bottom portion 14*b* of the condenser 14. According to such a configuration, it is possible to further reduce a probability that foreign matter sinking to the bottom portion 14*b* of the condenser 14 passes through the guard pipe 53 and reaches the in-condenser strainer 52. Accordingly, it is possible to further reduce the burden of cleaning.

In the present embodiment, the opening 53*h* provided in the guard pipe 53 is provided in the side wall 53*s* of the tubular portion 53*a* and reaches the bottom portion 14*b* of the condenser 14. According to such a configuration, it is possible to discharge all the condensate on the outer peripheral side of the guard pipe 53. Accordingly, it is possible to prevent a detection error made by a water level sensor provided in the condenser 14, and it is possible to improve workability at the time of repair or the like relating to the condenser 14.

MODIFICATION EXAMPLE

Next, some modification examples of the first embodiment will be described. Each modification example has the same configuration as that of the first embodiment except for configurations described below.

First Modification Example

Figure 6:
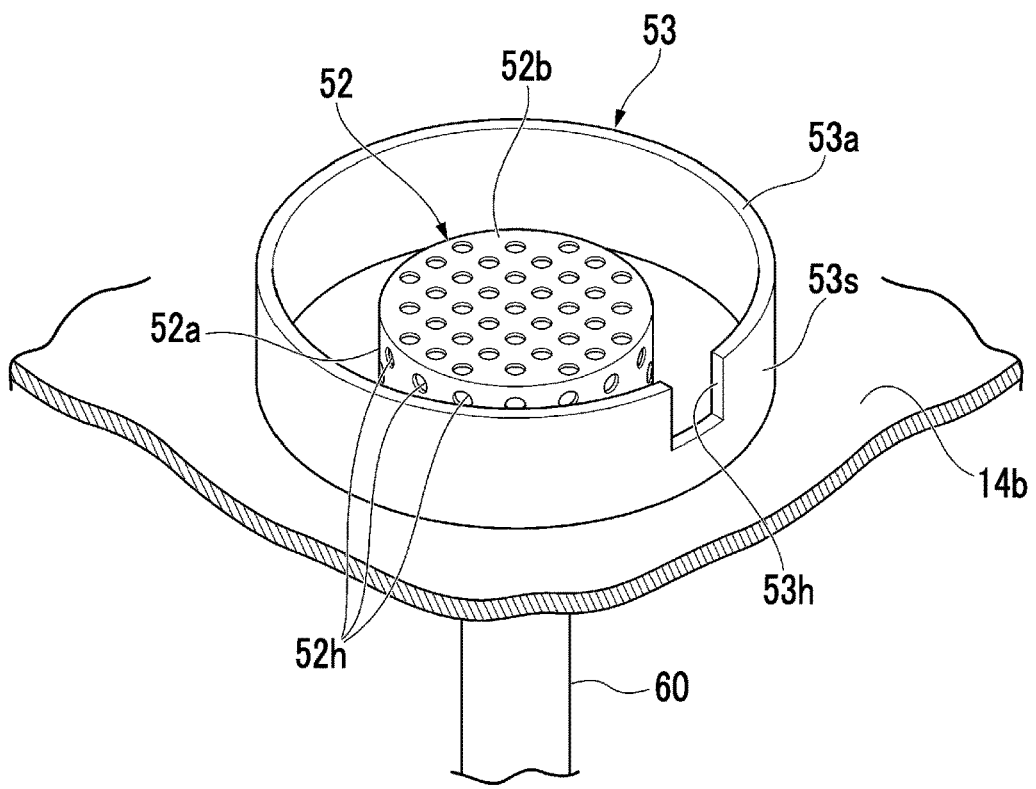
FIG. 6 is a perspective view showing a guard pipe according to a first modification example of the first embodiment of the present disclosure.

FIG. 6 is a perspective view showing the guard pipe 53 of a first modification example. The opening 53*h* provided in the guard pipe 53 of the first modification example is a notch provided at an upper end portion of the tubular portion 53*a*. Since the opening 53*h* is provided, a portion of the upper end portion of the tubular portion 53*a* is at a low position.

Second Modification Example

Figure 7:
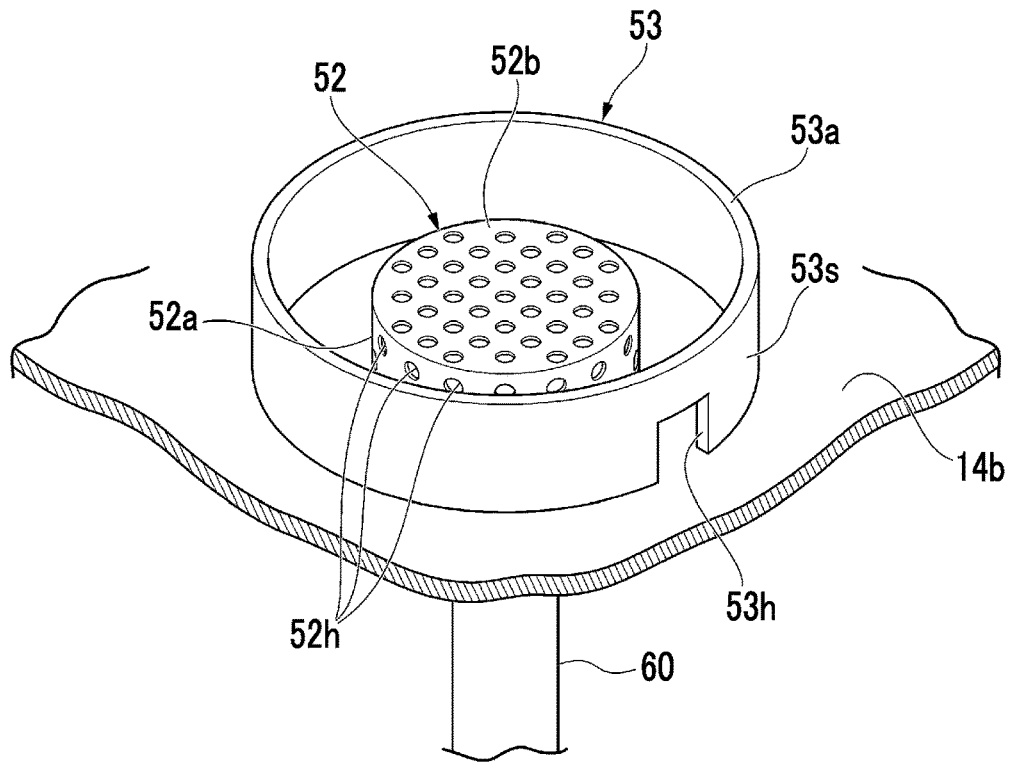
FIG. 7 is a perspective view showing a guard pipe according to a second modification example of the first embodiment of the present disclosure.

FIG. 7 is a perspective view showing the guard pipe 53 according to a second modification example. The opening 53*h* provided in the guard pipe 53 of the second modification example is a notch provided at a lower end portion of the tubular portion 53*a*. The opening 53*h* reaches the bottom portion 14*b* of the condenser 14. Since the opening 53*h* is provided, a communication portion through which the inside of the tubular portion 53*a* and the outside of the tubular portion 53*a* communicate with each other is formed between a portion of the lower end portion of the tubular portion 53*a* and the bottom portion 14*b* of the condenser 14.

Third Modification Example

Figure 8:
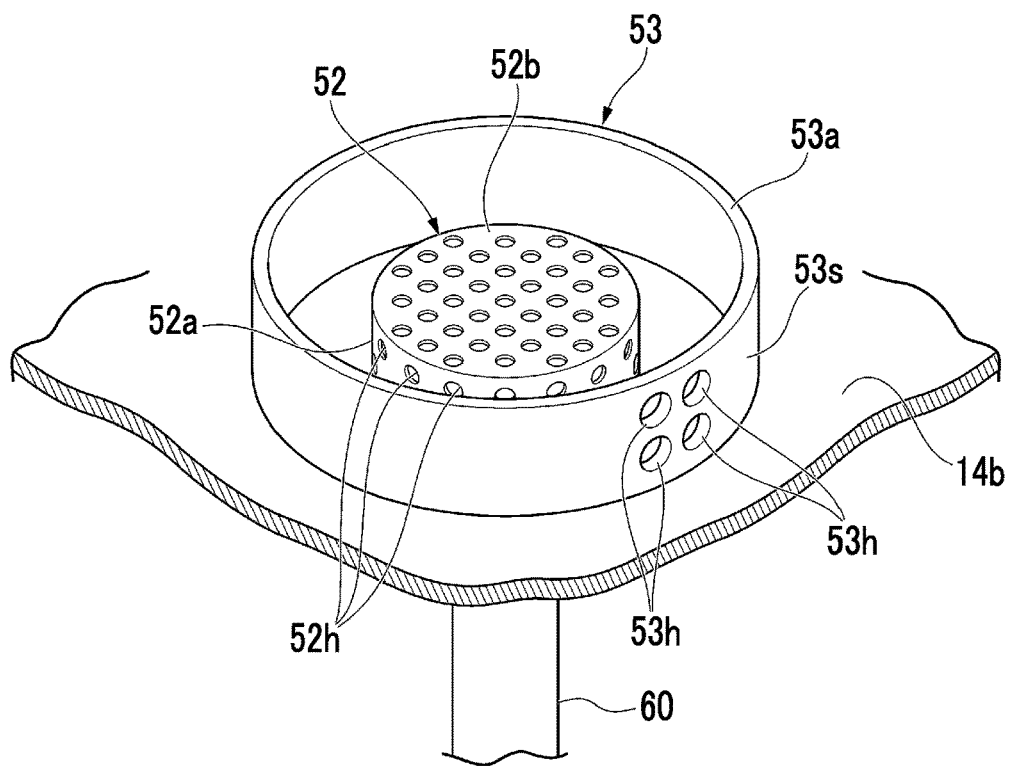
FIG. 8 is a perspective view showing a guard pipe according to a third modification example of the first embodiment of the present disclosure.

FIG. 8 is a perspective view showing the guard pipe 53 according to a third modification example. The guard pipe 53 of the third modification example includes one or more (for example, a plurality of) openings 53*h*. The openings 53*h* of the present modification example are circular holes provided in the tubular portion 53*a*. The plurality of openings 53*h* are disposed to be separated from each other in the circumferential direction of the tubular portion 53*a* and the vertical direction.

Fourth Modification Example

Figure 9:
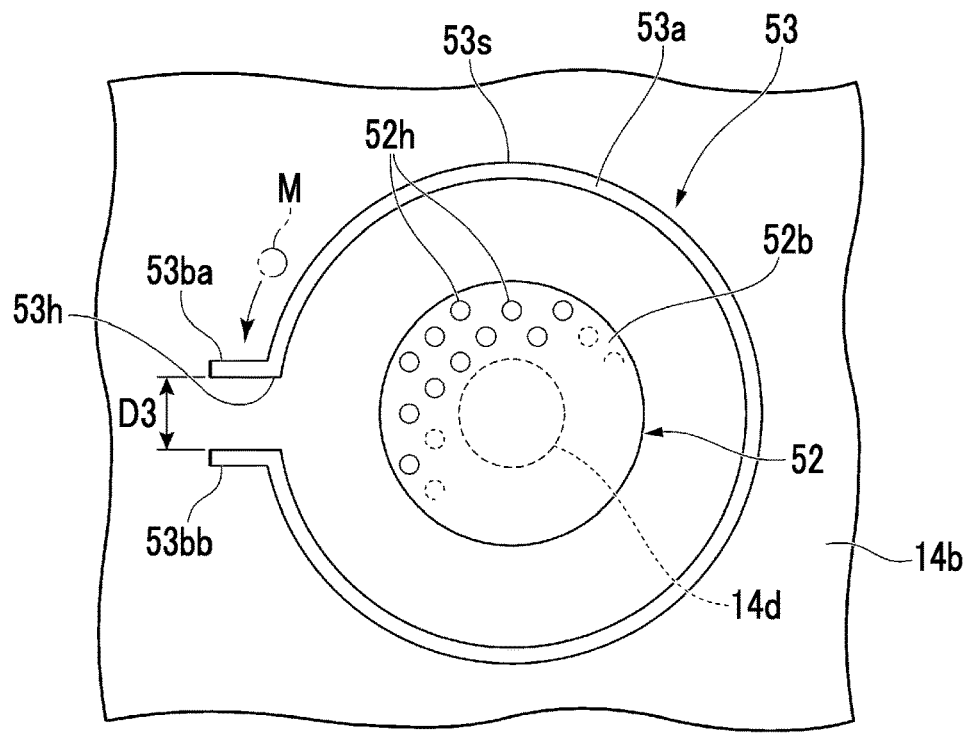
FIG. 9 is a plan view showing a guard pipe according to a fourth modification example of the first embodiment of the present disclosure.

FIG. 9 is a plan view showing the guard pipe 53 according to a fourth modification example. The guard pipe 53 of the fourth modification example includes the opening 53*h* provided in the tubular portion 53*a* and a pair of protrusion portions 53*ba* and 53*bb* provided on both sides of the opening 53*h*. The protrusion portions 53*ba* and 53*bb* protrude toward the outer peripheral side of the tubular portion 53*a* with respect to the outer peripheral surface of the side wall 53*s* of the tubular portion 53*a*. The protrusion portions 53*ba* and 53*bb* are provided over, for example, the entire height of the tubular portion 53*a*. The protrusion portions 53*ba* and 53*bb* restrain the foreign matter M on the outer peripheral side of the guard pipe 53 from moving around to flow into the inner peripheral side of the guard pipe 53 through the opening 53*h*. According to such a configuration, the in-condenser strainer 52 and the condensate pump suction strainer 51 are less likely to be clogged.

Second Embodiment

Next, a second embodiment of the present disclosure will be described with reference to FIGS. 10 to 13. The second embodiment is different from the first embodiment in that a temporary installation section B of a steam turbine plant 1A includes a temporary pipe 70. The second embodiment is the same as the first embodiment except for configurations described below. In the present embodiment, "condensation equipment CEA" is composed of the condenser 14, the collecting apparatus 50, and a condensate pipe 60A which will be described later. The condensate pipe 60A is a pipe that forms the condensate line 25.

(Configuration of Condensation Equipment)

Figure 10:
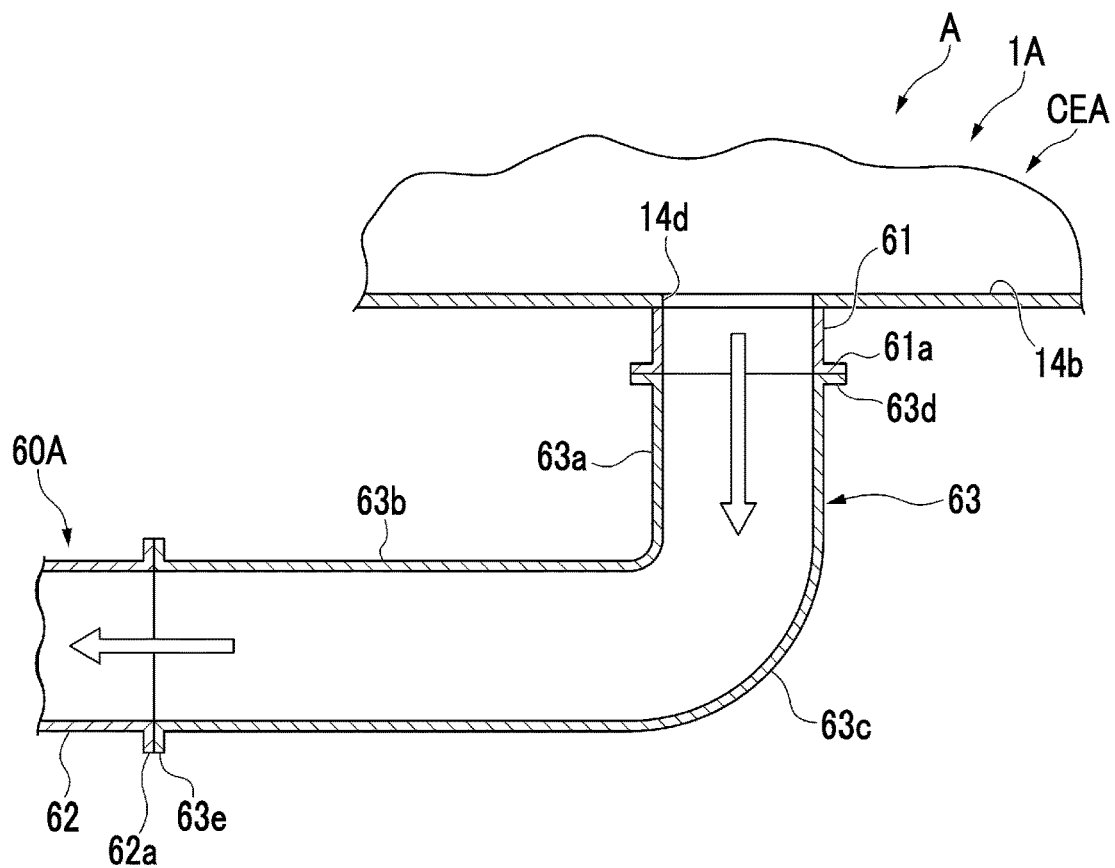
FIG. 10 is a cross-sectional view showing a permanent installation state of a portion of a condensate pipe according to a second embodiment of the present disclosure.

FIG. 10 is a cross-sectional view showing a permanent installation state (a commercial operation state) of a portion of the condensate pipe 60A. The permanent installation section A of the steam turbine plant 1A includes, as a portion of the condensate line 25, a first connection pipe 61, a second connection pipe 62, and an elbow pipe 63 (hereinafter, will be referred to as a "permanent elbow pipe 63" for the sake of distinction).

The first connection pipe 61 is connected to the bottom portion 14*b* of the condenser 14 and communicates with the drain port 14*d* of the condenser 14. For example, the first connection pipe 61 is disposed right below the drain port 14*d* of the condenser 14. The first connection pipe 61 extends downward (for example, downward in the vertical direction) from the bottom portion 14*b* of the condenser 14. A lower end (a downstream end) of the first connection pipe 61 is provided with a connecting portion 61*a*. The connecting portion 61*a* is, for example, a connection seat that is a connection flange.

The second connection pipe 62 is provided downstream of the permanent elbow pipe 63. The second connection pipe 62 is connected to the condensate pump 26 via the condensate pump suction strainer 51. The second connection pipe 62 extends in a horizontal direction. An upstream end of the second connection pipe 62 is provided with a connecting portion 62*a*. The connecting portion 62*a* is, for example, a connection seat that is a connection flange.

The permanent elbow pipe 63 is provided between the first connection pipe 61 and the second connection pipe 62 and is connected to the first connection pipe 61 and the second connection pipe 62. The permanent elbow pipe 63 includes, for example, a first flow path portion 63*a*, a second flow path portion 63*b*, a bent portion 63*c*, a first connecting portion 63d, and a second connecting portion 63e. The permanent elbow pipe 63 is an example of a "permanent pipe".

The first flow path portion 63a extends downward. The meaning of the expression "extends downward" is not limited to a case of extending downward in the vertical direction and includes a case of extending diagonally downward. The first flow path portion 63a is disposed right below the first connection pipe 61 (that is, right below the drain port 14d of the condenser 14) and is connected to the first connection pipe 61. An upstream end of the first flow path portion 63a is provided with the first connecting portion 63d. The first connecting portion 63d is a connecting portion that can be mounted to the connecting portion 61a of the first connection pipe 61. The first connecting portion 63d is, for example, a connection seat that is a connection flange.

The second flow path portion 63b is positioned downstream of the first flow path portion 63a. The second flow path portion 63b extends in a direction intersecting the first flow path portion 63a. In the present embodiment, the second flow path portion 63b extends in the horizontal direction, which is a direction orthogonal to the first flow path portion 63a. The second flow path portion 63b is connected to the second connection pipe 62. A downstream end of the second flow path portion 63b is provided with the second connecting portion 63e. The second connecting portion 63e is a connecting portion that can be mounted to the connecting portion 62a of the second connection pipe 62. The second connecting portion 63e is, for example, a connection seat that is a connection flange.

The bent portion 63c is positioned between the first flow path portion 63a and the second flow path portion 63b. The bent portion 63c is bent in a direction from the first flow path portion 63a to the second flow path portion 63b. The meaning of the expression "being bent" is not limited to being folded and also includes a case of being curved in an arc-like shape. The bent portion 63c connects the first flow path portion 63a and the second flow path portion 63b.

Figure 11:
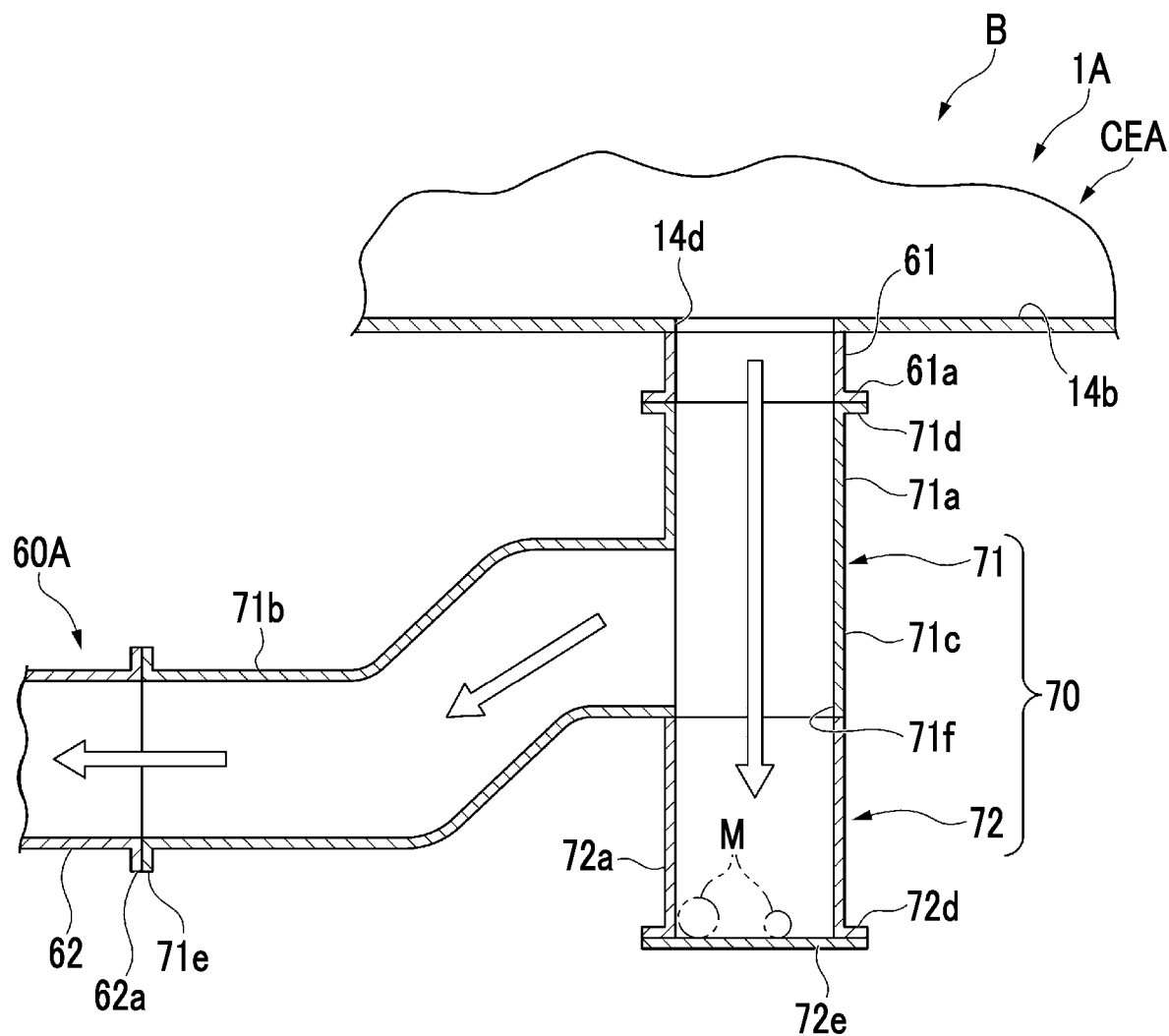
FIG. 11 is a cross-sectional view showing a temporary installation state of a portion of the condensate pipe according to the second embodiment of the present disclosure.

FIG. 11 is a cross-sectional view showing a temporary installation state (for example, a state at the time of the blowing-out operation) of a portion of the condensate line 25. The temporary installation section B of the steam turbine plant 1 includes, as a portion of the condensate line 25, the temporary pipe 70. The temporary pipe 70 is installed between the first connection pipe 61 and the second connection pipe 62 instead of the permanent elbow pipe 63. The temporary pipe 70 includes, for example, an elbow pipe 71 (hereinafter, referred to as a "temporary elbow pipe 71" for the sake of distinction) and the inertial collector 72.

The temporary elbow pipe 71 is installed between the first connection pipe 61 and the second connection pipe 62 instead of the elbow pipe 63 and is connected to the first connection pipe 61 and the second connection pipe 62. The temporary elbow pipe 71 includes, for example, a first flow path portion 71a, a second flow path portion 71b, a bent portion 71c, a first connecting portion 71d, and a second connecting portion 71e.

The first flow path portion 71a extends downward. For example, the first flow path portion 71a extends linearly downward in the vertical direction. The first flow path portion 71a is disposed right below the first connection pipe 61 (that is, right below the drain port 14d of the condenser 14) and is connected to the first connection pipe 61. An upstream end of the first flow path portion 71a is provided with the first connecting portion 71d. The first connecting portion 71d is a connecting portion that can be mounted to the connecting portion 61a of the first connection pipe 61.

The first connecting portion 71d is, for example, a connection seat that is a connection flange.

The second flow path portion 71b is positioned downstream of the first flow path portion 71a. The second flow path portion 71b extends in a direction intersecting the first flow path portion 71a. In the present embodiment, the second flow path portion 71b extends in the horizontal direction, which is a direction orthogonal to the first flow path portion 71a. The second flow path portion 71b is connected to the second connection pipe 62. A downstream end of the second flow path portion 71b is provided with the second connecting portion 71e. The second connecting portion 71e is a connecting portion that can be mounted to the connecting portion 62a of the second connection pipe 62. The second connecting portion 71e is, for example, a connection seat that is a connection flange.

The bent portion 71c is positioned between the first flow path portion 71a and the second flow path portion 71b. The bent portion 71c is bent in a direction from the first flow path portion 71a to the second flow path portion 71b. The bent portion 71c connects the first flow path portion 71a and the second flow path portion 71b. A lower end of the bent portion 71c includes an opening 71f that is open downward.

The inertial collector 72 branches off from the bent portion 71c and extends downward. The inertial collector 72 is provided below (for example, right below) the first flow path portion 71a and communicates with the opening 71f of the bent portion 71c. That is, the inertial collector 72 is disposed right below the drain port 14d of the condenser 14. The inertial collector 72 collects foreign matter that is separated from condensate flowing in the temporary elbow pipe 71 because of an inertial force.

Figure 12:
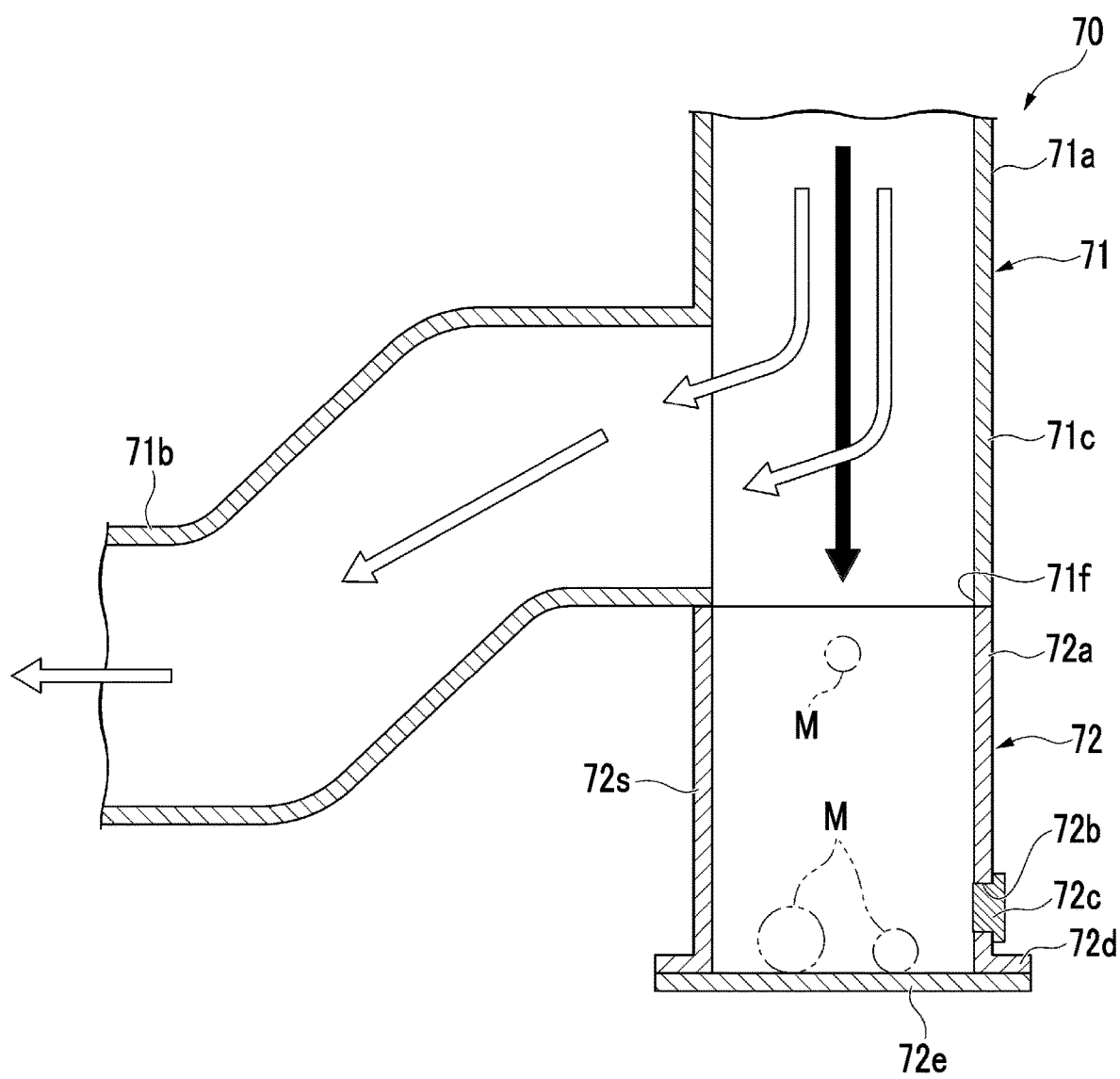
FIG. 12 is an enlarged sectional view showing a portion of a temporary pipe according to the second embodiment of the present disclosure.

FIG. 12 is an enlarged sectional view showing a portion of the temporary pipe 70. The inertial collector 72 includes, for example, a tubular portion 72a, a drain discharge port 72b, a closing member 72c, a connecting portion 72d, and a bottom portion cover 72e.

The tubular portion 72a is provided below (for example, right below) the first flow path portion 71a and communicates with the opening 71f of the bent portion 71c of the temporary elbow pipe 71. That is, the tubular portion 72a is disposed right below the drain port 14d of the condenser 14. The tubular portion 72a extends downward (for example, downward in the vertical direction). The tubular portion 72a includes a side wall 72s formed in a tubular shape.

The drain discharge port 72b is provided near a lower end of the tubular portion 72a. The drain discharge port 72b is an opening that is provided in the side wall 72s at a portion of the tubular portion 72a in the circumferential direction. Through the drain discharge port 72b, the inside of the tubular portion 72a and the outside of the tubular portion 72a communicate with each other. The closing member 72c is detachably attached to the drain discharge port 72b. In a case where the closing member 72c is attached, the drain discharge port 72b is closed. On the other hand, an operator can cause condensate and foreign matter accumulated in the inertial collector 72 to be discharged to the outside through the drain discharge port 72b by removing the closing member 72c.

The connecting portion 72d is provided at a lower end of the tubular portion 72a. The connecting portion 72d is a connecting portion to which the bottom portion cover 72e can be mounted. The connecting portion 72d is, for example, a connection seat that is a connection flange. The bottom portion cover 72e is attached to the connecting portion 72d and closes a lower portion of the tubular portion 72a.

(Procedure for Collecting Method)

Next, the procedure for a foreign matter collecting method according to the second embodiment will be described.

Figure 13:
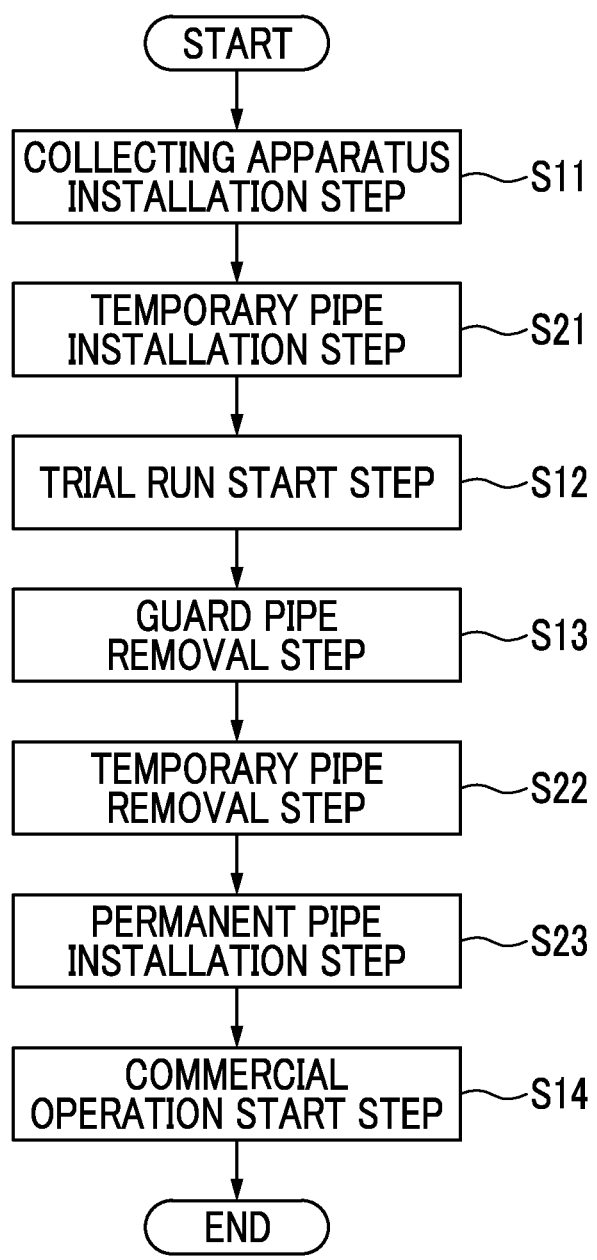
FIG. 13 is a flowchart showing the procedure for a collecting method according to the second embodiment of the present disclosure.

FIG. 13 is a flowchart showing the procedure for a collecting method according to the second embodiment of the present disclosure. The collecting method of the present embodiment includes a temporary pipe installation step (S21), a temporary pipe removal step (S22), and a permanent pipe installation step (S23) in addition to the steps in the collecting method of the first embodiment.

The temporary pipe installation step (S21) is performed before the trial run start step (S12). In the temporary pipe installation step (S21), the temporary pipe 70 including the inertial collector 72 is installed between the first connection pipe 61 and the second connection pipe 62. Thereafter, the trial run start step (S12) is performed. That is, the blowing-out operation is performed in a state where the temporary pipe 70 including the inertial collector 72 is installed.

The temporary pipe removal step (S22) and the permanent pipe installation step (S23) are performed after the trial run start step (S12) (that is, after the blowing-out operation) and before the commercial operation start step (S14). In the temporary pipe removal step (S22), the temporary pipe 70 is removed from between the first connection pipe 61 and the second connection pipe 62. Then, as the permanent pipe installation step (S23), the permanent elbow pipe 63 is installed between the first connection pipe 61 and the second connection pipe 62. Thereafter, the commercial operation start step (S14) is performed.

(Operation and Effect)

In the present embodiment, the temporary pipe 70 including the inertial collector 72 is installed as a portion of the condensate pipe 60A at the time of the blowing-out operation. In this case, an inertial force is applied to at least a portion of foreign matter contained in condensate flowing into the condensate pipe 60A from the drain port 14d of the condenser 14 while the condensate is flowing through the first connection pipe 61 and while the condensate is flowing through the first flow path portion 71a of the temporary elbow pipe 71, so that at least a portion of the foreign matter is separated from the condensate by the inertial force in a downward linear movement direction and is recovered into the inertial collector 72 when a direction in which the condensate flows is changed at the bent portion 71c of the temporary elbow pipe 71. A portion of the foreign matter M accumulated in a bottom portion of the inertial collector 72 is discharged to the outside through the drain discharge port 72b in a case where the closing member 72c is removed from the drain discharge port 72b. In addition, a portion of the foreign matter M accumulated in the bottom portion of the inertial collector 72 is discharged to the outside in a case where the bottom portion cover 72e is removed from the tubular portion 72a.

According to such a configuration, a portion of foreign matter causing the condensate pump suction strainer 51 to be clogged is collected by the inertial collector 72 and thus it is possible to restrain the foreign matter from reaching the condensate pump suction strainer 51. Accordingly, it is possible to restrain the condensate pump suction strainer 51 from being clogged. As a result, it is possible to reduce the burden of cleaning of the condensate pump suction strainer 51.

As seen from another viewpoint, by using the temporary pipe 70 including the inertial collector 72, it is possible to collect foreign matter contained in the condensate in the condenser 14 while preventing the condensate pump suction strainer 51 from being clogged. Therefore, as a method of performing the blowing-out operation, for example, a method of blowing out a gas into the condenser 14 at an initial stage of the blowing-out operation can be adopted. According to such a method of performing the blowing-out operation, for example, the number of steps necessary for the blowing-out operation can be made small in comparison with a case where the blowing-out operation is performed after a temporary pipe including an inertial collector is installed at the main steam line 21, the steam bypass line 41, or the like. Accordingly, a work period for construction or repair of the steam turbine plant 1A can be shortened.

OTHER EMBODIMENTS

Hereinabove, the embodiment of the present disclosure has been described in detail with reference to the drawings. However, a specific configuration is not limited to the embodiment, and design changes can be made without departing from the gist of the present disclosure.

Note that in the above-described embodiment, the in-condenser collector 50c includes the in-condenser strainer 52 and the guard pipe 53. However, the present disclosure is not limited thereto. The in-condenser collector 50c may be composed of only one of the in-condenser strainer 52 and the guard pipe 53, for example. In a case where the in-condenser collector 50c is composed of only the guard pipe 53, the dimension of the opening 53h of the guard pipe 53 is the "second dimension".

APPENDIX

The collecting apparatus 50, the condensation equipment CE, the condensation equipment CEA, and the collecting method described in the embodiments are understood, for example, as follows.

(1) The collecting apparatus 50 according to a first aspect is an apparatus which collects foreign matter mixed into condensate of the condenser 14 of the steam turbine plants 1 and 1A, the apparatus including the first foreign matter collector (for example, the condensate pump suction strainer 51) and the in-condenser collector 50c. The first foreign matter collector is provided upstream of the condensate pump 26 in the condensate pipes 60 and 60A connecting the drain port 14d provided at the bottom portion 14b of the condenser 14 and the condensate pump 26 to each other, includes the opening 51h having the first dimension, and collects the foreign matter while allowing the condensate to pass therethrough. The in-condenser collector 50c is provided in the condenser 14, includes the opening 52h (or the opening 53h) having the second dimension larger than the first dimension, and collects the foreign matter while allowing the condensate in the condenser 14 to pass therethrough and flow toward the drain port 14d.

According to such a configuration, the condensate in the condenser 14 is smoothly guided to the drain port 14d, at least a portion of the foreign matter causing the first foreign matter collector to be clogged is collected in the condenser 14, and the foreign matter can be restrained from reaching the first foreign matter collector. Accordingly, it is possible to restrain the first foreign matter collector from being clogged. As a result, it is possible to reduce the burden of cleaning of the first foreign matter collector.

As seen from another viewpoint, it is possible to collect foreign matter contained in the condensate in the condenser 14 while preventing the first foreign matter collector from being clogged. Therefore, as a method of performing the blowing-out operation, for example, a method of blowing out a gas into the condenser 14 at an initial stage of the blowing-out operation can be adopted. According to such a method of performing the blowing-out operation, for example, the number of steps necessary for the blowing-out operation can be made small in comparison with a case where the blowing-out operation is performed after a temporary pipe including an inertial collector is installed at the main steam line 21, the steam bypass line 41, or the like. Accordingly, a work period for construction or repair of the steam turbine plants 1 and 1A can be shortened.

(2) The collecting apparatus 50 according to a second aspect may be the collecting apparatus 50 of (1) in which the in-condenser collector 50c includes the second foreign matter collector (for example, the in-condenser strainer 52) that is disposed to cover the drain port 14d, that includes the opening 52h having the second dimension, and that collects the foreign matter while allowing the condensate to pass therethrough, and the third foreign matter collector (for example, the guard pipe 53) that is provided at the bottom portion 14b of the condenser 14, that surrounds the second foreign matter collector, that includes the opening 53h having the third dimension larger than the second dimension, and that collects the foreign matter while allowing the condensate to pass therethrough.

According to such a configuration, pieces of foreign matter having different sizes are collected by the third foreign matter collector, the second foreign matter collector, and the first foreign matter collector in order of size. Therefore, the second foreign matter collector and the first foreign matter collector are less likely to be clogged. Accordingly, it is possible to further reduce the burden of cleaning.

(3) The collecting apparatus 50 according to a third aspect may be the collecting apparatus 50 of (2) in which the height H2 of the third foreign matter collector with respect to the bottom portion 14b of the condenser 14 is larger than the height H1 of the second foreign matter collector with respect to the bottom portion 14b of the condenser 14.

According to such a configuration, it is possible to further reduce a probability that foreign matter sinking to the bottom portion 14b of the condenser 14 passes through the third foreign matter collector and reaches the second foreign matter collector. Therefore, the second foreign matter collector and the first foreign matter collector are less likely to be clogged. Accordingly, it is possible to further reduce the burden of cleaning.

(4) The collecting apparatus 50 according to a fourth aspect may be the collecting apparatus 50 of (2) or (3) in which the third foreign matter collector has a tubular shape with the side wall 53s surrounding the second foreign matter collector. The opening 53h having the third dimension, which is provided in the third foreign matter collector, may be provided in the side wall 53s and may reach the bottom portion 14b of the condenser 14.

According to such a configuration, it is possible to discharge all the condensate on the outer peripheral side of the third foreign matter collector. Accordingly, it is possible to prevent a detection error made by a water level sensor provided in the condenser 14, and it is possible to improve workability at the time of repair or the like relating to the condenser 14.

(5) The collecting apparatus 50 according to a fifth aspect may be the collecting apparatus 50 of (4) in which the opening 53h having the third dimension, which is provided in the third foreign matter collector, is a cut extending from an upper end to a lower end of the side wall 53s.

According to such a configuration, the third foreign matter collector can be manufactured relatively easily.

(6) The condensation equipment CE and the condensation equipment CEA according to a sixth aspect include the condenser 14 and the collecting apparatus 50 according to any one of (1) to (5).

According to such a configuration, it is possible to provide the condensation equipment CE and the condensation equipment CEA with which it is possible to reduce the burden of cleaning of the first foreign matter collector.

(7) The condensation equipment CEA according to a seventh aspect may further include the connecting portion 61a (or the connecting portion 62a) that is provided at the condensate pipe 60A and to which the temporary pipe 70 including the inertial collector 72 and a permanent pipe that is the elbow pipe 63 are selectively mountable as a portion of the condensate pipe 60A.

According to such a configuration, the workability at the time of installing the temporary pipe 70 including the inertial collector 72 as a portion of the condensate pipe 60A can be improved. Accordingly, a work period for construction or repair of the steam turbine plants 1 and 1A can be shortened.

(8) The condensation equipment CEA according to an eighth aspect may be the condensation equipment CEA of (7) in which the temporary pipe 70 includes the first flow path portion 71a through which the condensate discharged through the drain port 14d flows downward, the second flow path portion 71b that extends in a direction intersecting the first flow path portion 71a, and the bent portion 71c that is provided between the first flow path portion 71a and the second flow path portion 71b, and the inertial collector 72 branches off from the bent portion 71c and extends downward.

According to such a configuration, a portion of foreign matter causing the first foreign matter collector to be clogged is collected by the inertial collector 72 and thus it is possible to restrain the foreign matter from reaching the first foreign matter collector. Accordingly, it is possible to restrain the first foreign matter collector from being clogged. As a result, it is possible to reduce the burden of cleaning of the first foreign matter collector.

(9) The condensation equipment CEA according to a ninth aspect may be the condensation equipment CEA of (7) or (8) in which the inertial collector 72 is disposed right below the drain port 14d.

According to such a configuration, it is easy to apply, to the foreign matter, an inertial force in a direction toward the inertial collector 72. As a result, it is possible to increase the efficiency of collecting foreign matter by means of the inertial collector 72.

(10) A collecting method according to a tenth aspect is a collecting method of collecting foreign matter mixed into condensate of the condenser 14 of the steam turbine plants 1 and 1A, the method including installing, upstream of the condensate pump 26 in the condensate pipes 60 and 60A connecting the drain port 14d provided at the bottom portion 14b of the condenser 14 and the condensate pump 26 to each other, the first foreign matter collector (for example, the condensate pump suction strainer 51) that includes the opening 51h having the first dimension and that collects the foreign matter while allowing the condensate to pass therethrough, installing, in the condenser 14, the in-condenser collector 50c that includes the opening 52h (or the opening 53h) having the second dimension larger than the first dimension and that collects the foreign matter while allowing the condensate in the condenser 14 to pass therethrough and flow toward the drain port 14*d*, and performing the blowing-out operation in a state where the first foreign matter collector and the in-condenser collector 50*c* are installed.

According to such a configuration, it is possible to collect foreign matter contained in the condensate in the condenser 14 while preventing the first foreign matter collector from being clogged. Therefore, as a method of performing the blowing-out operation, for example, a method of blowing out a gas into the condenser 14 at an initial stage of the blowing-out operation can be adopted. According to such a method of performing the blowing-out operation, for example, the number of steps necessary for the blowing-out operation can be made small in comparison with a case where the blowing-out operation is performed after a temporary pipe including an inertial collector is installed at the main steam line 21, the steam bypass line 41, or the like. Accordingly, a work period for construction or repair of the steam turbine plants 1 and 1A can be shortened.

(11) The collecting method according to an eleventh aspect may be the collecting method of (10), in which the temporary pipe 70 including the inertial collector 72 is installed as a portion of the condensate pipe 60A, and the blowing-out operation is performed in a state where the temporary pipe 70 is installed.

According to such a configuration, it is possible to collect foreign matter contained in the condensate in the condenser 14 while further preventing the first foreign matter collector from being clogged.

INDUSTRIAL APPLICABILITY

According to the collecting apparatus, the condensation equipment, and the collecting method of the present disclosure, it is possible to reduce the burden of cleaning.

REFERENCE SIGNS LIST

1, 1A: Steam turbine plant
11: Boiler
12: Steam turbine
13: Generator
14: Condenser
14*b*: Bottom portion
14*d*: Drain port
21: Main steam line
25: Condensate line
26: Condensate pump
31: Water supply line
41: Steam bypass line
50: Collecting apparatus
50*c*: In-condenser collector
51: Condensate pump suction strainer
51*h*: Opening
52: In-condenser strainer
52*h*: Opening
53: Guard pipe
53*h*: Opening
60, 60A: Condensate pipe
61: First connection pipe
61*a*: Connecting portion
62: Second connection pipe
62*a*: Connecting portion
63: Elbow pipe (permanent elbow pipe)
70: Temporary pipe
71: Elbow pipe (temporary elbow pipe)
72: Inertial collector
CE, CEA: Condensation equipment

The invention claimed is:

1. A collecting apparatus for collecting foreign matter mixed into condensate of a condenser of a steam turbine plant, the apparatus comprising:
    a first foreign matter collector to be arranged upstream of a condensate pump in a pipe connecting a drain port at a bottom portion of the condenser and the condensate pump to each other, the first foreign matter collector including a first opening having a first dimension, and being configured to collect the foreign matter while allowing the condensate to pass therethrough; and
    an in-condenser collector to be arranged in the condenser, the in-condenser collector including a second opening having a second dimension larger than the first dimension, and being configured to collect the foreign matter while allowing the condensate in the condenser to pass therethrough and flow toward the drain port, the in-condenser collector including:
        a second foreign matter collector to cover the drain port, the second foreign matter collector including the second opening having the second dimension, and configured to collect the foreign matter while allowing the condensate to pass therethrough, and
        a third foreign matter collector at the bottom portion of the condenser and surrounding the second foreign matter collector, the third foreign matter collector including a third opening having a third dimension larger than the second dimension, and configured to collect the foreign matter while allowing the condensate to pass therethrough.

2. The collecting apparatus according to claim 1, wherein a height of the third foreign matter collector relative to the bottom portion of the condenser is larger than a height of the second foreign matter collector relative to the bottom portion of the condenser.

3. The collecting apparatus according to claim 1, wherein:
    the third foreign matter collector has a tubular shape with a side wall surrounding the second foreign matter collector, and
    the third opening of the third foreign matter collector and having the third dimension is in the side wall and reaches the bottom portion of the condenser.

4. The collecting apparatus according to claim 3, wherein the third opening having the third dimension is a slot extending from an upper end to a lower end of the side wall.

5. Condensation equipment comprising:
    a condenser of a steam turbine plant;
    a collecting apparatus configured to collect foreign matter mixed into condensate of the condenser, the collecting apparatus comprising:
        a foreign matter collector upstream of a condensate pump in a pipe connecting a drain port at a bottom portion of the condenser and the condensate pump to each other, the foreign matter collector including a first opening having a first dimension, and being configured to collect the foreign matter while allowing the condensate to pass therethrough; and
        an in-condenser collector in the condenser, the in-condenser collector including a second opening having a second dimension larger than the first dimension, and being configured to collect the foreign matter while allowing the condensate in the condenser to pass therethrough and flow toward the drain port; and a connecting portion at the pipe and to which a temporary pipe including an inertial collector and a permanent elbow pipe are selectively mountable as a portion of the pipe.

6. The condensation equipment according to claim 5, wherein:

the temporary pipe includes a first flow path portion through which the condensate discharged through the drain port flows downward, a second flow path portion extending in a direction intersecting the first flow path portion, and a bent portion between the first flow path portion and the second flow path portion, and the inertial collector branches off from the bent portion and extends downward.

7. The condensation equipment according to claim 5, wherein the inertial collector is disposed right below the drain port.

8. The collecting apparatus according to claim 5, wherein the in-condenser collector further includes:

a second foreign matter collector to cover the drain port, the second foreign matter collector including the second opening having the second dimension, and configured to collect the foreign matter while allowing the condensate to pass therethrough, and a third foreign matter collector at the bottom portion of the condenser and surrounding the second foreign matter collector, the third foreign matter collector including a third opening having a third dimension larger than the second dimension, and configured to collect the foreign matter while allowing the condensate to pass therethrough.

9. A collecting method of collecting foreign matter mixed into condensate of a condenser of a steam turbine plant, the method comprising:

installing, upstream of a condensate pump in a pipe connecting a drain port at a bottom portion of the condenser and the condensate pump to each other, a first foreign matter collector including a first opening having a first dimension and configured to collect the foreign matter while allowing the condensate to pass therethrough;

installing, in the condenser, an in-condenser collector including a second opening having a second dimension larger than the first dimension and configured to collect the foreign matter while allowing the condensate in the condenser to pass therethrough and flow toward the drain port;

installing a temporary pipe including an inertial collector as a portion of the pipe, and performing a blowing-out operation in a state where the first foreign matter collector, the in-condenser collector, and the temporary pipe are installed.

* * * * *